UNITED STATES PATENT OFFICE 2,552,263

α-ANTHRAPYRIDINEQUINONE COMPOUNDS

Joseph B. Dickey, Rochester, N. Y., assignor to Eastman Kodak Company, Rochester, N. Y., a corporation of New Jersey No Drawing. Application September 27, 1947, Serial No. 776,611

6 Claims. (Cl. 260—288)

This invention relates to new α-anthrapyridinequinone compounds and their application to the art of dyeing or coloring. Textile materials made from organic derivatives of cellulose, wool, silk or nylon and cellulose ester as well as cellulose ether lacquers, for example, can be colored. Coloration can be effected by dyeing, printing, stenciling or other suitable methods. Certain of the compounds are also valuable for the coloring of gasoline and other hydrocarbons.

For purposes of clarity it is here noted that the name α-anthrapyridinequinone as used herein means the compound having the following structure and numbering:

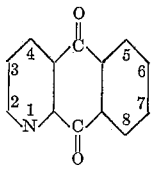

Other names for this ring system exist in the literature such as α-anthrapyridylanthraquinone; 6,7-benzoquinolinequinone-5,8; azanthraquinone; 2,3-phthaloylpyridine; and benzoquinoline-5,10-dione.

It is an object of my invention to further the art of dyeing by providing new α-anthrapyridinequinone dye compounds. Another object is to provide a satisfactory process for the dyeing of various textile materials including organic derivatives of cellulose, wool, silk or nylon textile materials with the new dye compounds of my invention. A further object is to provide dyed textile materials of the character just indicated which possess good fastness to light, gas, and washing. A further object is to provide a satisfactory process for preparing the compounds of my invention. Other objects will appear hereinafter.

The α-anthrapyridinequinone compounds of my invention by means of which the above objects are accomplished or made possible have the general formula:

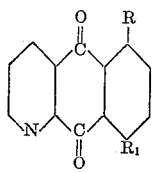

wherein R and R₁ each represent a hydroxy group or an

group, wherein X represents a hydrogen atom, a primary straight-chain alkyl group having one to sixteen, inclusive, carbon atoms, a secondary alkyl group having three to four, inclusive, carbon atoms, a monohydroxyalkyl group having two to four, inclusive, carbon atoms, an alkoxyalkyl group having three to six, inclusive, carbon atoms, a monohydroxyalkoxyalkyl group having four to six, inclusive, carbon atoms, the β,γ-dihyroxypropyl group, a β,β-difluoroethyl group, a β,β,β-trifluoroethyl group, a β,β-difluoropropyl group, a γ,γ-difluoropropyl group, a γ,γ,γ-trifluoropropyl group, a δ,δ,δ-trifluorobutyl group, a δ,δ-difluoroamyl group, the terahydrofurfuryl group, the cyclohexyl group, the benzyl group, a phenyl group, a sulfonated pheny group, a tolyl group, a sulfonated tolyl group, an alkoxyphenyl group in which the alkoxy group contains one to two, inclusive, carbon atoms, a sulfonated alkoxyphenyl group in which the alkoxy group contains one to two, inclusive, carbon atoms and a monoaminophenyl group, and wherein at least one of the members R and R₁ must be an

group.

I have discovered that ammonia and primary organic amines of the formula:

$$H_2N-X$$

wherein X has the meaning previously assigned to it will react with leuco 5,8-dihydoxy-α-anthrapyridinequinone under suitable reaction conconditions to replace one or both of the hydroxy groups. The compounds resulting from this condensation reaction are highly colored and have the formula given in the preceding paragraph.

The non-sulfonated compounds of my invention constitute valuable dyes for the coloration of the materials hereinbefore named, especially for the coloration of carboxylic esters of cellulose having from two to four carbon atoms in the acid groups thereof. They are particularly useful for the coloration of cellulose acetate. Water-soluble acidic dyes are prepared by sulfonating the arylamino compounds of my invention. These sulfonated compounds possess little or no utility for the coloration of cellulose esters but can be used to dye wool and silk. A further application of the compounds of my invention is for the coloration of gasoline and other hydrocarbons. For this purpose X is an alkyl group having at least four carbon atoms. Hyrdoxyalkylamino compounds of my invention may be esterified with sulfuric, phosphoric or phosphorous acids to produce water-soluble dyes which, if they contain no sulfonic acid group, have affinity for silk, nylon, wool, and cellulose acetate.

The starting material for the preparation of the compounds of my invention is 5,8-dihydroxy-α-anthrapyridinequinone, a known compound (Chemisches Zentralblatt 1928 (1) 2091). The conversion of this compound to its leuco form is easily effected by suitable treatment with a slight excess of sodium hydrosulfite in the presence of ammonia or sodium hydroxide. This conversion can be carried out in the manner described hereinafter.

The amino-α-anthrapyridinequinone compounds of my invention are prepared by heating leuco 5,8-dihydroxy-α-anthrapyridinequinone with the desired primary amine or amines and then oxidizing the leuco amino derivative formed to its non-leuco form. The amination reaction may be carried out under pressure or under reflux at atmospheric pressure depending on the amine employed. The duration of heating will also depend on the starting materials, solvent, catalyst, etc. In general a heating period of about ten hours is required for maximum yield. The amination may be assisted by the addition of a catalyst such as boric acid, sodium bisulfite, or sodium chlorate. A solvent may be used if desired. Suitable solvents include water, pyridine, ethanol, butanol, and the like. When cool, the leuco dye is oxidized to its non-leuco form by treatment with a mild oxidant such as air in the presence of cupric sulfate, sulfuric acid, nitrobenzene, sodium perborate, and the like. If precipitation does not ocur on oxidation, water may be added to precipitate the dye from the reaction medium.

In some case the non-leuco 5,8-dihydroxy-α-anthrapyridinequinone may be reacted directly with the amine either with or without a catalyst.

Illustrative but not limitative of the amines which are employed to produce the compounds of my invention are the following: ammonia, methylamine, ethylamine, propylamine, isopropylamine, butylamine, secondary butylamine, amylamine, β-hydroxyethylamine, β-hydroxypropylamine, γ-hydroxypropylamine, δ-hydroxybutylamine, β,γ-dihydroxypropylamine, β-methoxyethylamine, β-ethoxyethylamine, β-butoxyethylamine, β-hydroxy-β-ethoxyethylamine, γ-hydroxy-γ-propoxypropylamine, β,β-difluoroethylamine, β,β,β-trifluoroethylamine, γ,γ,γ-trifluoropropylamine, β,β-difluoropropylamine, γ,γ-difluoropropylamine, δ,δ,δ-trifluorobutylamine, δ,δ-difluoroamylamine, tetrahydrofurfurylamine, cyclohexylamine, benzylamine, aniline, para-toluidine, ortho-toluidine, para-anisidine, ortho-anisidine, para-phenetidine, ortho-phenetidine, para-phenylenediamine, and ortho-phenylenediamine.

It will be understood that one or both of the hydroxy groups of the 5,8-dihydroxy-α-anthrapyridinequinone may be aminated. Furthermore, it should be emphasized that valuable unsymmetrical products are obtained by employing a mixture of two different amines at one time in the amination reaction or by causing, for example, one equivalent at a time of two different amines to react with the starting material. In the latter case the mono-aminated intermediate need not be isolated before proceeding with the second condensation. In the case of a monoamination or a mixed amination as just referred to it is believed that a mixture of isomers results because so far as I am aware there is equal probability of attack on both the 5-hydroxy and the 8-hydroxy groups.

The following examples illustrate the preparation of the compounds of my invention.

EXAMPLE 1

24.3 grams of leuco-5,8-dihyroxy-α-anthrapyridinequinone are charged into an autoclave with 200 cc. of concentrated ammonia water (28%) and the reaction mixture is heated at 100° to 110° C. for 10 hours. When cool, the leuco dye solution is removed and oxidized by heating in concentrated sulfuric acid (98%) or by heating in nitrobenze. The resulting solid 5,8-diamino-α-anthrapyridinequinone colors cellulose acetate and nylon violet shades from an aqueous suspension of the dye.

By reducing the amount of ammonia and carrying out the reaction at room temperature, the mono-aminated compounds, leuco-5-amino-8-hydroxy-anthrapyridinequinone and leuco-5-hydroxy-8-amino-α-anthrapyridinequinone, are obtained and then oxidized as above. These dyes color cellulose acetate and nylon pinkish-red shades from aqueous suspension.

EXAMPLE 2

24.3 grams (0.1 mole) of 5,8-dihydroxy-anthrapyridinequinone are heated in 500 cc. of pyridine under reflux with 6 (0.133 mole) grams of ethylamine. Refluxing is continued for 10 hours. When cool, water is added, and the precipitated hydroxy-ethylamino-α-anthrapyridinequinone is recovered by filtration, washed with water and dried. The dye compound thus obtained colors cellulose acetate and nylon violet shades from an aqueous suspension of the dye.

In place of ethylamine 4.2 grams (.133 mole) of methylamine, 7.9 grams (.133 mole) of propylamine, 9.7 grams (.133 mole) of butylamine, 13.2 grams (.133 mole) of cyclohexylamine, 21 grams (.133 mole) of decylamine, or 32.2 grams (.133 mole) of hexadecylamine are reacted in exactly the same manner to yield the corresponding mono-alkylamino-hydroxy-α-anthrapyridinequinone compounds.

EXAMPLE 3

24.3 grams (0.1 mole) of 5,8-dihydroxy-α-anthrapyridinequinone and 8.1 grams (.133 mole) of ethanolamine are dissolved in 500 cc. of pyridine and heated under reflux for ten hours. When cool, water is added, and the precipitated hydroxy-β-hydroxyethylamino-α-anthrapyridinequinone is recovered by filtration, washed with water and dried. From aqueous suspension this dye colors cellulose acetate violet shades.

In place of ethanolamine 10 grams (.133 mole) of γ-hydroxypropylamine, 10 grams (.133 mole) of β-hydroxypropylamine, 11.9 grams (.133 mole) of δ-hydroxybutylamine, 12.1 grams (.133 mole) of β,γ-dihydroxypropylamine, 10 grams (.133 mole) of β-methoxyethylamine, 11.9 grams (.133 mole) of β-ethoxyethylamine, 15.6 grams (.133 mole) of β-butoxyethylamine, 14 grams (.133 mole) of β-hydroxy-β-ethoxyethylamine, or 17.8 grams (.133 mole) of γ-hydroxy-γ-propoxypropylamine are condensed with 5,8-dihydroxy-α-anthrapyridinequinone in exactly the same manner to yield the corresponding mono-aminated derivatives.

EXAMPLE 4

24.3 grams (0.1 mole) of leuco-5,8-dihydroxy-α-anthrapyridinequinone and 22 cc. (.213 mole) of a 30% aqueous solution of methylamine are heated under reflux in 500 cc. of butanol for ten hours. When cool, the leuco dye formed is oxidized to its non-leuco form by passing air into the solution. The dye is precipitated by adding water, recovered by filtration, washed with water and dried. The resulting 5,8-dimethylamino-α-anthrapyridinequinone colors cellulose acetate blue from an aqueous suspension of the dye.

In place of leuco-5,8-dihydroxy-α-anthrapyridinequinone in the foregoing example we may use as a starting material 0.1 mole of any one of the following: leuco-5-hydroxy-8-amino-α-anthrapyridineqinone, leuco-5-amino-8-hydroxy-α-anthrapyridinequinone, or leuco-5,8-diamino-α-anthrapyridinequinone to obtain 5,8-dimethylamino-α-anthrapyridinequinone. Similarly, 32 cc. (.213 mole) of a 30% aqueous solution of ethylamine may be substituted for the methylamine solution in the above example to obtain blue 5,8-diethylamino-α-anthrapyridinequinone. This compound colors cellulose aceate blue shades. The reaction conditions of this example may be employed to condense other alkylamines with leuco-5,8-dihydroxy-α-anthrapyridinequinone. For example 12.5 grams (.213 mole) of normal propylamine gives 5,8-dipropylamino-α-anthrapyridinequinone, and 12.5 grams (.213 mole) of isopropylamine gives 5,8-diisopropylamino-α-anthrapyridinequinone. Both of these compounds color cellulose acetate blue shades.

EXAMPLE 5

24.3 grams (0.1 mole) of leuco-5,8-dihydroxy-α-anthrapyridinequinone in 500 cc. of butanol are heated under reflux for ten hours with 15.5 grams (.213 mole) of normal-butylamine. When cool, the leuco dye formed is oxidized to its non-leuco form by passing air into the solution. The dye is precipitated by adding water, recovered by filtration, washed with water and dried. The resulting 5,8-dibutylamino-α-anthrpyridinequinone colors cellulose acetate blue shades from an aqueous suspension of the dye.

Under exactly the same conditions 15.5 grams (.213 mole) of secondary-butylamine may replace normal-butylamine to give 5,8-di-secondary-butylamino-α-anthrapyridinequinone. This compound colors cellulose acetate blue shades. In the same manner 5,8-diamylamino-α-anthrpyridinequinone may be prepared by substituting 18.5 grams (.213 mole) of normal-amylamine for normal-butylamine. It colors cellulose acetate blue shades.

EXAMPLE 6

24.3 grams (0.1 mole) of leuco-5,8-dihydroxy-α-anthrapyridinequinone, 45.6 grams (.213 mole) of hexadecylamine, and 10 grams of boric acid are heatedu nder reflux in 500 cc. of butanol for 10 hours. After adding 0.5 gram of copper sulfate air is passed into the boiling solution until the leuco dye formed is completely oxidized to its non-leuco form. After cooling, 5,8-dihexadecylamino-α-anthrapyridinequinone is recovered by filtration, washed with water, and dried. It colors cellulose acetate, gasoline, and other hydrocarbons blue shades. In a similar manner 33.4 grams (.213 mole) of decylamine is substituted for the hexadecylamine to obtain 5,8-didecylamino-α-anthrapyridinequinone. This compound also colors cellulose acetate, gasoline, and other hydrocarbons blue shades.

EXAMPLE 7

24.3 grams (0.1 mole) of leuco-5,8-dihydroxy-α-anthrapyridinequinone are suspended in 500 cc. of butanol. After adding 21 grams (.213 mole) of cyclohexylamine the reaction mixture thus formed is heated under reflux for ten hours. After adding 0.5 gram of copper sulfate air is passed into the solution until it has assumed a blue coloration. Upon cooling, 5,8-dicyclohexylamino-α-anthrapyridinequinone precipitates out and is recovered by filtration, washed with water, and dried. It colors cellulose acetate blue shades. In a similar manner 22.8 grams (.213 mole) of benzylamine is substituted for the cyclohexylamine to obtain 5,8-dibenzylamino-α-anthrapyridinequinone. This compound also colors cellulose acetate blue shades.

EXAMPLE 8

A mixture of 24.3 grams (0.1 mole) of leuco-5,8-dihydroxy-α-anthrapyridinequinone, 13 grams (.213 mole) of ethanalomine, and 500 cc. of butanol is heated under reflux for ten hours. When cool, the leuco dye formed is oxidized to its non-leuco form by passing air into the solution. The dye is precipitated by adding water, recovered by filtration, washed with water, and dried. The resulting 5,8-di-β-hydroxyethylamino-α-anthrpyridinequinone colors cellulose acetate blue shades from an aqueous suspension of the dye.

Under exactly the same conditions 16 grams (.213 mole) of γ-hydroxypropylamine may replace β-hydroxyethylamine to yield 5,8-di-γ-hydroxypropylamino-α-anthrapyridinequinone. This compound also colors cellulose acetate blue shades. In the same manner 5,8-di-δ-hydroxybutylamino-α-anthrapyridinequinone may be prepared by substituting 19 grams (.213 mole) of δ-hydroxybutylamine for the ethanolamine. It colors cellulose acetate blue shades.

EXAMPLE 9

24.3 grams (0.1 mole) of leuco-5,8-dihydroxy-α-anthrapyridinequinone in 500 cc. of butanol are heated under reflux for ten hours with 19.4 grams (.213 mole) of β,γ-dihydroxypropylamine. When cool, the leuco dye formed is oxidized to its non-leuco form by passing air into the solution. The dye is precipitated by adding water, recovered by filtration, washed with water, and dried. The resulting 5,8-di-β,γ-dihydroxypropylamino-α-anthrapyridinequinone colors cellulose acetate blue shades from an aqueous suspension.

The reaction conditions of this example may be employed to condense other substituted alkylamines with leuco-5,8-dihydroxy-α-anthrapyridinequinone. For example, 22.4 grams (.213 mole) of β-hydroxy-β-ethoxyethylamine yields 5,8-di-β-hydroxy-β-ethoxyethylamino-α-anthrapyridinequinone and 28.4 grams (.213 mole) of γ-hydroxy-γ-propoxypropylamine yields 5,8-di-γ-hydroxy-γ-propoxypropylamino-α-anthrapyridinequinone. Both of these compounds color cellulose acetate blue shades.

EXAMPLE 10

In a solution of 16 grams (.213 mole) of β-methoxyethylamine in 500 cc. of butanol 24.3 grams (0.1 mole) of 5,8-dihydroxy-α-anthrapyridinequinone are suspended. The suspension is heated under reflux for ten hours. After adding 0.5 gram of copper sulfate air is led through the solution until oxidation is complete. After cooling, the dye compound formed precepitates and is recovered by filtration, washed with water, and dried. The resulting 5,8-di-β-methoxyethyl-amino-α-anthrapyridinequinone colors cellulose acetate blue shades.

Similarly, 19 grams (.213 mole) of β-ethoxyethlyamine may be substituted for the β-methoxyethylamine to yield 5,8-di-β-ethoxyethyl-amino-α-anthrapyridinequinone. Furthermore, 25 grams (.213 mole) of β-butoxyethylamine may be substituted for the β-methoxyethylamine to yield 5,8 - di - β-butoxyethylamino-α-anthrapyridinequinone. Both of these compounds color cellulose acetate blue shades.

EXAMPLE 11

To a suspension of 24.3 grams (0.1 mole) of leuco-5,8-dihydroxy-α-anthrapyridinequinone in 500 cc. of butanol are added 21.5 grams (.213 mole) of tetrahydrofurfurylamine. The mixture is heated for ten hours under reflux. 0.5 gram of copper sulfate is added and air is passed into the solution until the leuco dye formed is completely oxidized to its non-leuco form. When cool, water is added and the precipitated dye compound is recovered by filtration, washed with water, and dried. The resulting 5,8-ditetrahydrofurfurylamino - α-anthrapyridinequinone colors cellulose acetate blue shades from an aqueous suspension of the dye.

EXAMPLE 12

A mixture of 24.3 grams (0.1 mole) of leuco-5,8-dihydroxy-α-anthrapyridinequinone, 16.5 cc. (.11 mole) of a 30% aqueous solution of ethylamine, 11.3 cc. (.11 mole) of a 30% aqueous solution of methylamine, and 500 cc. of butanol are heated under reflux for ten hours. 0.5 gram of copper sulfate is then added, and air is passed into the solution until the leuco dye formed is completely oxidized to its non-leuco form. When cool, water is added, and the precipitated dye compound is recovered by filtration, washed with water, and dried. The resulting methylamino-ethylamino-α-anthrapyridinequinone dye colors cellulose acetate blue shades.

Similarly other mixtures of amines may be employed under the conditions of this example to produce other unsymmetrical dyes. Thus 6.5 grams (.11 mole) of normal propylamine may be substituted for the ethylamine solution to obtain methylamino-normal-propylamino-α-anthrapyridinequinone. And 6.5 grams (.11 mole) of isopropylamine may be substituted for the ethylamine solution to obtain methylamino-isopropyl-amino-α-anthrapyridinequinone. Both of these dye compounds color cellulose acetate blue shades.

EXAMPLE 13

6.7 grams (.11 mole) of ethanolamine and 11.3 cc. (.11 mole) of a 30% aqueous solution of methylamine are added to a suspension of 24.3 grams (0.1 mole) of leuco-5,8-dihydroxy-α-anthrapyridinequinone in 500 cc. of butanol. The mixture is heated under reflux for 10 hours. 0.5 grams of copper sulfate is then added, and air is passed into the solution until the leuco dye formed is completely oxidized to its non-leuco form. When cool, water is added, and the precipitated dye compound is recovered by filtration, washed with water, and dried. The resulting methylamino - β - hydroxyethylamino - α-anthrapyridinequinone dye colors cellulose acetate blue shades.

Under exactly the same reaction conditions other amines may be substituted for the amines of this example to obtain different unsymmetrical compounds. Thus, by the use of 9.8 grams (.11 mole) of β-ethoxyethylamine in place of the methylamine solution one obtains β-hydroxyethylamino-β-ethoxyethylamino - α - anthrapyridinequinone. Similarly, by the use of 11.5 grams (.11 mole) of β-hydroxy-β-ethoxyethylamine in place of the methylamine solution β-hydroxyethylamino-β-hydroxy-β- ethoxyethylamino - α- anthrapyridinequinone is obtained. Both of these compounds color cellulose acetate blue shades.

EXAMPLE 14

24.3 grams (0.1 mole) of leuco-5,8-dihydroxy-α-anthrapyridinequinone, 11.1 grams (.11 mole) of tetrahydrofurfurylamine, and 10 grams (.11 mole) of β-γ-dihydroxypropylamine are introduced into 500 cc. of butanol, and the mixture is heated under reflux for ten hours. 0.5 gram of copper sulfate is then added and air is passed into the solution until the leuco dye formed is oxidized completely to its non-leuco form. When cool, water is added, and the precipitated dye compound is recovered by filtration, washed with water, and dried. The resulting tetrahydrofurfurylamino-β,γ-dihydroxypropylamino - α-anthrapyridinequinone colors cellulose acetate blue shades from an aqueous suspension.

Similar dyestuffs are obtained if equivalent amounts of other amines are substituted for the amines of this example. For example, by the use of 11.3 cc. (.11 mole) of a 30% aqueous solution of methylamine in place of the tetrahydrofurfurylamine under the conditions of this example methylamino-β,γ - dihydroxypropylamino-α-anthrapyridinequinone which colors cellulose acetate blue shades is obtained. Similarly, by the use of 6.7 grams (.11 mole) of ethanolamine in place of tetrahydrofurfurylamine β,γ-dihydroxypropylamino-β-hydroxyethylamino-α - anthrapyridinequinone is obtained. This dye compound colors cellulose acetate blue shades.

EXAMPLE 15

A mixture of 24.3 grams (0.1 mole) of leuco-5,8 - diamino - α - anthrapyridinequinone, 10.2 grams (.11 mole) of aniline, and 500 cc. of butanol, are heated under reflux for 10 hours. 0.5 gram of copper sulfate is then added and air is passed into the solution until the leuco dye formed is completely oxidized to its non-leuco form. When cool, water is added and the precipitated dye compound is recovered by filtration, washed with water, and dried. The resulting amino - phenylamino - α - anthrapyridinequinone colors cellulose acetate blue shades.

Similarly other amines may be substituted for aniline in this example. Thus by the use of 11.3 cc. (.11 mole) of a 30% aqueous solution of methylamine in place of aniline amino-methylamino - α - anthrapyridinequinone is obtained. This compound colors cellulose acetate blue shades. As another example by the use of 6.7 grams (.11 mole) of ethanolamine in place of aniline amino-β-hydroxyethylamino- α - anthrapyridinequinone is obtained. This compound also colors cellulose acetate blue shades.

EXAMPLE 16

24.3 grams (0.1 mole) of leuco-5,8-diamino-α-anthrapyridinequinone, 10.2 grams (.11 mole) of aniline and 11.3 cc. (.11 mole) of a 30% aqueous solution of methylamine are introduced into 500 perborate ($NaBO_3—2H_2O$). When cool, the precipitated amino-$\beta,\beta$-difluoroethylamino-$\alpha$-anthrapyridinequinone is recovered by filtration, washed with water, and dried. This compound colors cellulose acetate purpose from an aqueous suspension of the dye.

Employing exactly the same procedure other amines may be substituted for the $\beta,\beta$-difluoroethylamine of this example. For example, 10.5 grams (.11 mole) of $\beta,\beta$-difluoropropylamine yields amino-$\beta$-$\beta$-difluoropropylamino-$\alpha$-anthrapyridinequinone. And 10.9 grams of $\beta,\beta,\beta$-trifluoroethylamine yields amino-$\beta,\beta,\beta$-trifluorethylamino-$\alpha$-anthrapyridinequinone. Both of these compounds color cellulose acetate purple shades.

EXAMPLE 22

24.3 grams (0.1 mole) of leuco-5,8-dihydroxy-$\alpha$-anthrapyridinequinone, 19 grams (.213 mole) of $\beta,\beta$-difluoroethylamine, and 500 cc. of butanol are heated under reflux for fifteen hours or until no further color change occurs. 0.5 gram of copper acetate is added to the boiling mixture and air is passed in until the leuco dye formed is completely oxidized to its non-leuco form. When cool, water is added and the precipitated material is collected on a suction filter, washed with water, and dried. The resulting 5,8-di($\beta,\beta$-difluoroethylamino)-$\alpha$-anthrapyridinequinone colors cellulose acetate blue shades from an aqueous suspension of the dye.

Similarly, other fluoroalkylamines may replace the $\beta,\beta$-difluoroethylamine in this example. Thus 20 grams (.213 mole) of $\beta,\beta$-difluoropropylamine yields 5,8-di($\beta,\beta$-difluoropropylamino)-$\alpha$-anthapyridinequinone and 20 grams (.213 mole) of $\gamma,\gamma$-difluoropropylamine yields 5,8-di($\gamma,\gamma$-difluoropropylamino)-$\alpha$-anthrapyridinequinone. Both of these compounds color cellulose acetate blue shades.

EXAMPLE 23

A mixture of 24.3 grams (0.1 mole) of leuco-5,8-dihydroxy-$\alpha$-anthrapyridinequinone, 21 grams (.213 mole) of $\beta,\beta,\beta$-trifluoroethylamine, and 500 cc. of butanol is heated under reflux for fifteen hours or until no further color change occurs. 0.5 grams of copper acetate are added to the boiling mixture and air is passed in until the leuco dye formed is completely oxidized to its non-leuco form. When cool, water is added and the precipitated dye is recovered by filtration, washed with water, and dried. The resulting 5,8-di($\beta,\beta,\beta$-trifluoroethylamino)-$\alpha$-anthrapyridinequinone colors cellulose acetate blue shades from an aqueous suspension of the dye.

Using exactly the same procedure other fluoroalkylamines may replace the $\beta,\beta,\beta$-trifluoroethylamine of this example. Thus 24 grams (.213 mole) of $\gamma,\gamma,\gamma$-trifluoropropylamine yields 5,8-di-($\gamma,\gamma,\gamma$-trifluoropropylamino)-$\alpha$-anthrapyridinequinone and 26 grams (.213 mole) of $\delta,\delta,\delta$-trifluorobutylamine yields 5,8-di($\delta,\delta,\delta$-trifluorobutylamino)-$\alpha$-anthrapyridinequinone. Both of these compounds color cellulose acetate blue shades.

EXAMPLE 24

24.3 grams (0.1 mole) of leuco-5,8-dihydroxy-$\alpha$-anthrapyridinequinone is placed in 500 cc. of butanol with 9 grams (.11 mole) of $\beta,\beta$-difluoroethylamine and 10.5 grams (.11 mole) of $\gamma,\gamma$-difluoropropylamine. The reaction mixture is heated under reflux for fifteen hours or until no further color change takes place. 0.5 gram of copper acetate is added, and air is passed into the boiling solution until the leuco dye formed is completely oxidized to its non-leuco form. When cool, water is added, and the precipitated dye is recovered by filtration, washed with water, and dried. The resulting $\beta,\beta$-difluoroethylamino-$\gamma,\gamma$-difluoropropylamino-$\alpha$-anthrapyridinequinone colors cellulose acetate reddish-blue shades from an aqueous suspension of the dye.

In place of the two fluoroalkylamines of this example it will be understood that combinations of equivalent amounts of any of the fluoroalkylamines hereinbefore mentioned may be employed to produce other unsymmetrically substituted 5,8-difluoroalkylamino-$\alpha$-anthrapyridinequinone compounds. These dyes color cellulose acetate from blue to reddish-blue shades.

EXAMPLE 25

24.3 grams (0.1 mole) of leuco-5,8-dihydroxy-$\alpha$-anthrapyridinequinone, 12.4 grams (.11 mole) of $\gamma,\gamma,\gamma$-trifluoropropylamine, and 14 grams (.11 mole) of $\delta,\delta$-difluoroamylamine are reacted together and worked up as in Example 24. The resulting $\gamma,\gamma,\gamma$-trifluoropropylamino-$\delta,\delta$-difluoroamylamino-$\alpha$-anthrapyridinequinone colors cellulose acetate blue shades from an aqueous suspension.

EXAMPLE 26

To a solution of 24.3 grams (0.1 mole) of leuco-5,8-dihydroxy-$\alpha$-anthrapyridinequinone in 500 cc. of boiling butanol under reflux 6.1 grams (.11 mole) of ethanolamine are added dropwise over a period of four hours. Then 9 grams (.11 mole) of $\beta,\beta$-difluoropropylamine are added dropwise over a period of five hours. Heating under reflux is continued for an additional ten hours. 0.5 gram of copper acetate is added, and air is passed into the boiling solution until all of the leuco dye formed is oxidized to its non-leuco form. When cool, water is added, and the precipitated dye is recovered by filtration, washed with water, and dried. The resulting $\beta$-hydroxyethylamino-$\beta,\beta$-difluoropropylamino-$\alpha$-anthrapyridinequinone colors cellulose acetate reddish-blue shades from an aqueous suspension.

Using exactly the same procedure any of the other fluoroalkylamines and any of the other hydroxyalkylamines hereinbefore mentioned may be substituted for the amines of this example to obtain other unsymmetrical hydroxyalkylaminofluoroalkylamino-$\alpha$-anthrapyridinequinone compounds. Thus 10 grams (.11 mole) of $\beta,\gamma$-dihydroxypropylamine are substituted for the ethanolamine and 9 grams (.11 mole) of $\beta,\beta$-difluoroethylamine are substituted for the $\beta,\beta$-difluoropropylamine to obtain $\beta,\gamma$-dihydroxypropylamine-$\beta,\beta$-difluoroethylamino-$\alpha$-anthrapyridinequinone. This compound colors cellulose acetate reddish-blue shades.

EXAMPLE 27

24.3 grams (0.1 mole) of leuco-5,8-dihydroxy-$\alpha$-anthrapyridinequinone, 11.3 cc. (.11 mole) of a 30% aqueous solution of methylamine, and 12.4 grams (.11 mole) of $\gamma,\gamma,\gamma$-trifluoropropylamine are reacted and worked up as in Example 26. The resulting methylamino-$\gamma,\gamma,\gamma$-trifluoropropylamino-$\alpha$-anthrapyridinequinone colors cellulose acetate reddish blue shades from an aqueous suspension.

cc. of butanol and the mixture is heated under reflux for ten hours. 0.5 gram of copper sulfate is then added and air is passed into the solution until the leuco dye formed is oxidized completely to its non-leuco form. When cool, water is added, and the precipitated dye compound is recovered by filtration, washed with water, and dried. The resulting methylamino - phenylamino-α-anthra-pyridinequinone colors cellulose acetate blue shades from an aqueous suspension of the dye.

Similar dyestuffs are obtained if equivalent amounts of other amines are substituted for the amines of this example. Thus by the use of 6.7 grams (.11 mole) of ethanolamine in place of the methylamine solution β - hydroxyethylamino-phenylamino - α - anthrapyridinequinone which colors cellulose acetate blue shades is obtained. Also by the use of 11.5 grams (.11 mole) of β-hydroxy - β - ethoxyethylamine in place of the methylamine solution phenylamino-β-hydroxy-β - ethoxyethylamino - α - anthrapyridinequinone which colors cellulose acetate blue shades is obtained.

EXAMPLE 17

24.3 grams (0.1 mole) of 5,8-dihydroxy-α-anthrapyrindinequinone, 200 grams of aniline, and 10 grams of boric acid are heated to 180° C. until no further change toward the blue takes place. The excess aniline is removed by steam distillation and the blue solid which forms is recovered by filtration, washed with water, and dried. The 5,8 - diphenylamino - α - anthrapyridinequinone thus obtained dyes cellulose acetate and nylon blue from an acqueous suspension.

This compound may be sulfonated by dissolving 10 grams of it in a mixture of 50 grams of sulfuric acid monohydrate and 12 grams of fuming sulfuric acid of 20 percent strength. The resulting solution is maintained for about 12 hours at a temperature of 40 to 50° C. and then ice is added thereto. The separated dyestuff is filtered off, washed with a concentrated salt solution until a sample of the washings is neutral to litmus, and converted into the sodium salt form by dissolving it in an aqueous sodium carbonate solution. This sulfonated dyestuff colors silk and wool greenish-blue shades from an aqueous solution of the dye that may contain salt.

Using exactly the same procedure 200 grams of p-toluidine are substituted for the aniline of this example to obtain 5,8-di-p-toluidino-α-anthrapyridinequinone. This compound colors cellulose acetate blue shades from an aqueous suspension. If desired the dye may be sulfonated as above to yield an acid dyestuff which colors wool and silk greenish-blue shades.

EXAMPLE 18

To a suspension of 24.3 grams (0.1 mole) of leuco-5,8-dihydroxy-α-anthrapyridinequinone in 500 cc. of butanol are added 22.7 grams (.213 mole) of para-phenylenediamine and 10 grams of boric acid. The mixture is heated under reflux for ten hours whereupon 0.5 gram of copper sulfate is added and air is passed into the solution until oxidation of the leuco dye formed to the non-leuco form is complete. When cool, water is added, and the precipitated dyestuff is collected on a suction filter, washed with water, and dried. The resulting 5,8-di-para-phenylenediamino-α-anthrapyridinequinone colors cellulose acetate green shades from an aqueous suspension of the dye. In an exactly analogous manner 26.2 grams (.213 mole) of para-anisidine can be used in place of para-phenylenediamine to obtain 5,8-di-para-anisidino-α-anthrapyridinequinone. This compounds colors cellulose acetate bluish-green shades.

EXAMPLE 19

24.3 grams (0.1 mole) of leuco-5,8-dihydroxy-α-anthrapyridinequinone are placed in a one-liter flask containing 9 grams (0.11 mole) of β,β-difluoroethylamine and 30 cc. of ethanol. The reaction mixture is heated under reflux with stirring for fifteen hours. 0.5 gram of copper acetate and several drops of pyridine are added, and air is passed into the boiling solution until the leuco dye formed is completely oxidized to its non-leuco form. When cool, the reaction mixture is poured into twice its volume of water and the precipitate is recovered by filtration, washed with water, and dried. The resulting dye, hydroxy-β,β-difluoroethylamino-α-anthrapyridinequinone colors cellulose acetate violet from an aqueous suspension of the dye.

In place of the β,β-difluoroethylamine 10.5 grams (.11 mole) of β,β-difluoropropylamine may be employed under the conditions of this example to obtain hydroxy - β,β - difluoropropylamino-α-anthrapyridinequinone. Other amines may also be substituted for the β,β-difluoroethylamine of this example. For example, 11 grams (.11 mole) of β,β,β-trifluoroethylamine may be employed to obtain hydroxy - β,β,β - trifluoroethylamino - α - anthrapyridinequinone and 10.5 grams (.11 mole) of γ,γ-difluoropropylamine may be employed to obtain hydroxy-γ,γ-difluoropropylamino - α - anthrapyridinequinone. All of these compounds color cellulose acetate violet shades.

EXAMPLE 20

24.3 grams (0.1 mole) of leuco-5,8-dihydroxy-α-anthrapyridinequinone are placed in a one-liter flask containing 12.4 grams (.11 mole) of γ,γ,γ-trifluoropropylamine and 30 cc. of ethanol. The reaction mixture is heated under reflux with stirring for fifteen hours. 0.5 gram of copper acetate and several drops of pyridine are added, and air is passed into the boiling solution until the leuco dye formed is completely oxidized to its non-leuco form. When cool, the reaction mixture is poured into twice its volume of water and the precipitate is recovered by filtration, washed with water, and dried. The resulting dye, hydroxy-γ,γ,γ-trifluoropropylamino - α - anthrapyridinequinone, colors cellulose acetate violet shades from an aqueous suspension of the dye.

Similarly, 14 grams (.11 mole) of δ,δ,δ-trifluorobutylamine is substituted for the γ,γ,γ-trifluoropropylamine to obtain hydroxy-δ,δ,δ-trifluorobutylamine and 13.5 grams (.11 mole) of δ,δ-difluoroamylamine is substituted for the γ,γ,γ-trifluoropropylamine to obtain hydroxy-δ,δ-difluoroamylamino-α-anthrapyridinequinone. Both of these dyes color cellulose acetate violet shades.

EXAMPLE 21

A mixture of 24.3 grams (0.1 mole) of leuco-5,8-diamino-α-anthrapyridinequinone and 500 cc. of butanol is heated to boiling under reflux. Then 9 grams (.11 mole) of β,β-difluoroethylamine are added dropwise with stirring over a period of ten hours. Heating is continued for an additional five hours whereupon the leuco dye formed is oxidized to its non-leuco form by adding 600 cc. (0.15 mole) of a 3% aqueous solution of sodium

EXAMPLE 28

24.3 grams (0.1 mole) of leuco-5,8-dihydroxy-α-anthrapyridinequinone, 8 grams (.11 mole) of n-butylamine, and 11 grams (.11 mole) of β,β,β-trifluoroethylamine are reacted and worked up as in Example 27. The resulting normal-butylamino-γ,γ,γ-trifluoroethylamino - α - anthrapyridinequinone colors cellulose acetate reddish-blue shades from an aqueous suspension.

EXAMPLE 29

24.3 grams of leuco-5,8-dihydroxy-α-anthrapyridinequinone, 26.5 grams (.11 mole) of hexadecylamine, and 13.5 grams (.11 mole) of δ,δ-difluoroamylamine are reacted and worked up as in Example 27. The resulting hexadecylamino-δ,δ - difluoroamylamino-α-anthrapyridinequinone colors cellulose acetate reddish-blue shades from an aqueous suspension.

EXAMPLE 30

To a solution of 24.3 grams (0.1 mole) of leuco-5,8-dihydroxy-α-anthrapyridinequinone in 500 cc. of boiling butanol under reflux 8.2 grams (.11 mole) of β-methoxyethylamine are added dropwise over a period of four hours. Then 10.5 grams (.11 mole) of γ,γ-difluoropropylamine are added dropwise over a period of five hours. Heating under reflux is continued for an additional ten hours. 0.5 gram of copper acetate is added, and air is passed into the boiling solution until all of the leuco dye formed is oxidized to its non-leuco form. When cool, water is added, and the precipitated dye is recovered by filtration, washed with water, and dried. The resulting β-methoxyethylamino - γ,γ - difluoropropylamino-α-anthrapyridinequinone colors cellulose acetate reddish-blue shades from an aqueous suspension.

Using exactly the same procedure any of the other fluoroalkylamines and any of the other alkoxyalkylamines hereinbefore mentioned may be substituted for the amines of this example to obtain other unsymmetrical alkoxyalkylamino-fluoroalkylamino-α-anthrapyridinequinone compounds. Thus, 12.9 grams (.11) mole of β-butoxyethylamine are substituted for the β-methoxyethylamine and 14 grams (.11 mole) of δ,δ,δ-trifluorobutylamine are substituted for the γ,γ-difluoropropylamine to obtain β-butoxyethylamine-δ,δ,δ - trifluorobutylamino - α - anthrapyridinequinone. This compound colors cellulose acetate reddish-blue shades.

EXAMPLE 31

*Preparation of leuco-5,8-dihydroxy-α-anthrapyridinequinone*

24.3 grams of 5,8-dihydroxy-α-anthrapyridinequinone, 500 cc. of water, and 12 grams of sodium hydroxide are stirred vigorously together and warmed to 50° C. 45 grams of sodium hydrosulfite are then added with stirring, and the resulting mixture is agitated for one hour. After cooling the precipitate of leuco-5,8-dihydroxy-α-anthrapyridinequinone is recovered by filtration, washed with cold water, and dried.

Several of the fluoroalkylamines which I have employed to prepare the compounds of my invention are new compounds which have not hereto been described. The preparation of these valuable intermediates is given hereinafter.

A. β,β-DIFLUOROPROPYLAMINE 48 grams of β,β-difluoroethylbromide prepared by fluorinating 2-chloro - 1,2 - dibromopropane with hydrogen fluoride or mercuric fluoride are heated with 200 cc. of a 28% aqueous solution of ammonia and 1 gram of a sulfonated alkylated naphthalene (Nacconal NR) in a shaking autoclave at 130–150° C. for 24 hours. The reaction product is then carefully distilled through an efficient column, ammonia gas coming off first. The amine fraction boiling at from 60° C. to 85° C. is then collected in the receiver and dried over solid sodium hydroxide. Finally, the product is decanted into fresh solid sodium hydroxide and fractionally redistilled. The fraction boiling at 75–77° C. and having a refractive index, $$N_D^{25} = 1.3622$$

is β,β-difluoropropylamine. It is a colorless liquid miscible with water and with ordinary organic solvents and has a characteristic amine odor.

B. δ,δ-DIFLUOROAMYLAMINE 61 grams of δ,δ-difluoroamylbromide are substituted for the β,β-difluoropropylbromide in the foregoing example and treated in an identical manner to obtain δ,δ-difluoroamylamine.

C. γ,γ-DIFLUOROPROPYLAMINE 130 grams (0.82 mole) of γ,γ-difluoropropylbromide and 328 cc. (6 moles) of a 28% aqueous solution of ammonia are heated in a shaking autoclave at 110–120° C. for 24 hours. The cooled contents are poured into five moles of cold, concentrated hydrochloric acid and filtered. The filtrate is evaporated to dryness under reduced pressure on a water bath. The amine salts are separated from $NH_4Cl$ and $NH_4Br$ by extraction with eight 200 cc. portions of absolute ethanol. The ethanol solution is evaporated to dryness and shaken with 300 grams of a 50% aqueous solution of potassium hydroxide. The resulting mixture separates into two layers. The non-aqueous layer is withdrawn and several ether extractions of the aqueous layer are added thereto. On distillation there is obtained γ,γ-difluoropropylamine boiling at 92–94° C./760 mm. of Hg and having a refractive index $N_D^{20} = 1.3650$. Some bis-γ,γ-difluoropropylamine is also obtained boiling at 91–94° C./50 mm. Hg and having a refractive index $N_D^{20} = 1.3744$. Both are colorless liquids having a characteristic amine odor.

D. γ,γ-DIFLUOROPROPYLBROMIDE

In a stainless-steel or nickel lined shaking autoclave cooled by a dry ice and acetone mixture are placed 200–250 grams of anhydrous liquid hydrogen fluoride. To this are added with stirring 200 grams of mercuric oxide in small portions. Then 281 grams of pre-cooled 1,1,3-tribromopropane are added and the autoclave closed. The reaction mixture is heated and shaken at 50–80° C. for five to eight hours. The autoclave is then cooled to room temperature and the hydrogen fluoride is vented through a water scrubber which is connected to a cooled condensing system. After the hydrogen fluoride has been completely removed by heating the autoclave to 60° C., the autoclave is again cooled. The liquid contents are removed and steam distilled together with any material which collected in the condensing system during the removal of hydrogen fluoride. The non-aqueous layer of the steam distillate is then dried over calcium chloride and fractionally distilled. A better than 50% yield of 1,1-difluoro-3-bromopropane boiling at 92–94° C. is obtained.

In the application of the α-anthrapyridinequinone compounds of my invention to the coloration of cellulose carboxylic ester textile materials, especially cellulose acetate textile materials, the dye compound will ordinarily be applied in the form of an aqueous suspension, which may be prepared by grinding the dye to a paste with a dispersing agent such as a soap, a sulfonated oil, or a higher fatty acid glyceryl sulfate, and then dispersing the paste in warm water. The material to be colored is immersed in this dispersion starting with a bath temperature of approximately 45-55° C., which is gradually increased to 80-85° C., at which point it is ordinarily maintained until dyeing is complete, i. e. usually 1 to 3 hours. Sodium chloride may be added to facilitate the exhaustion of the dye bath during the dyeing operation. When the material has acquired the desired shade or condition of color, it is removed from the bath, washed with soap, rinsed, and dried. In the case where the particular dye compound is water-soluble, as with many of the sulfonated and phosphated derivatives, the dye may be applied in known manner directly from an aqueous solution of the dye containing salt, without the necessity of employing a dispersing or solubilizing agent. Ordinarily the sulfonated dyestuffs of my invention are applied only to the coloration of silk and woolen textile materials because of their poor affinity for textile materials containing cellulose derivatives. Wool, silk, and nylon textile materials and cellulose ether lacquers can be colored by the methods normally employed in the art for the coloration of these materials.

I claim:

1. An α-anthrapyridinequinone compound having the general formula:

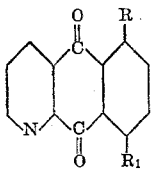

wherein R and R₁ each represent an

group, wherein X represents a member selected from the group consisting of a β,β-difluoroethyl group, a β,β,β-trifluoroethyl group, a β,β-difluoropropyl group, a γ,γ-difluoropropyl group, a γ,γ,γ-trifluoropropyl group, a δ,δ,δ-trifluorobutyl group and a δ,δ-difluoroamyl group.

2. The anthrapyridinequinone compound having the formula:

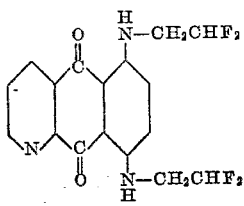

3. The anthrapyridinequinone compound having the formula:

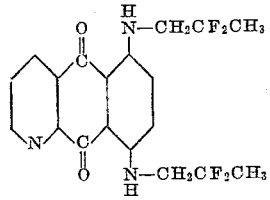

4. The anthrapyridinequinone compound having the formula:

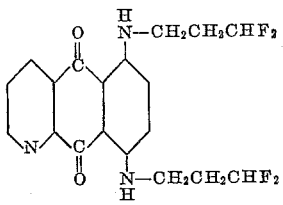

5. The anthrapyridinequinone compound having the formula:

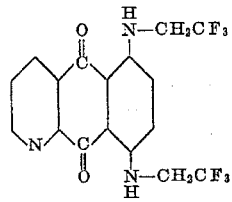

6. The anthrapyridinequinone compound having the formula:

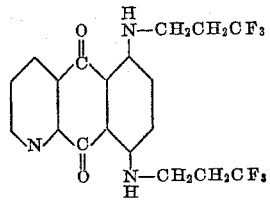

JOSEPH B. DICKEY.

REFERENCES CITED

The following references are of record in the file of this patent:

UNITED STATES PATENTS

| Number | Name | Date |
|---|---|---|
| 2,051,004 | Koeberle et al. | Aug. 11, 1936 |
| 2,185,709 | Ogilvie et al. | Jan. 2, 1940 |

FOREIGN PATENTS

| Number | Country | Date |
|---|---|---|
| 597,833 | Germany | May 3, 1934 |

OTHER REFERENCES

Chemisches Zentralblatt, vol. 99, page 2091 (1928).